United States Patent
Evans (10) Patent No.: US 7,044,151 B2
(45) Date of Patent: May 16, 2006

(54) PISTON-ACTIVATED VALVE AND METHODS AND APPARATUS FOR RESTRAINING FREE PLAY IN A DEVICE

(75) Inventor: Griffith S. Evans, Downers Grove, IL (US)

(73) Assignee: Scot Incorporated, Downers Grove, IL (US)

( * ) Notice: Subject to any disclaimer, the term of this patent is extended or adjusted under 35 U.S.C. 154(b) by 486 days.

(21) Appl. No.: 10/044,934

(22) Filed: Jan. 15, 2002

(65) Prior Publication Data

US 2002/0092560 A1    Jul. 18, 2002

Related U.S. Application Data

(60) Provisional application No. 60/261,199, filed on Jan. 16, 2001.

(51) Int. Cl.
*F16K 17/40* (2006.01)

(52) U.S. Cl. .................... 137/68.16; 137/68.13; 83/639.4; 403/263

(58) Field of Classification Search ............ 60/635, 60/636, 914; 92/23; 83/639.4; 137/68.13, 137/68.16; 403/263
See application file for complete search history.

(56) References Cited

U.S. PATENT DOCUMENTS

| 2,030,686 | A | * | 2/1936 | Davis | 60/636 |
|---|---|---|---|---|---|
| 2,674,852 | A | * | 4/1954 | Michael | 60/636 |
| 2,903,849 | A | * | 9/1959 | Fawcett et al. | 60/636 |
| 3,698,488 | A | * | 10/1972 | Yoder et al. | 172/311 |
| 3,872,556 | A | * | 3/1975 | Frost | 24/603 |
| 3,940,185 | A | | 2/1976 | Katzer | |
| 3,991,649 | A | * | 11/1976 | Patrichi | 60/636 |
| 4,085,916 | A | * | 4/1978 | Pedersen | 403/263 |
| 4,205,896 | A | | 6/1980 | Borsuk | |
| 4,420,272 | A | * | 12/1983 | Ingalls et al. | 403/4 |
| 4,570,658 | A | | 2/1986 | Dean et al. | |
| 4,619,284 | A | | 10/1986 | Delarue et al. | |
| 4,813,163 | A | | 3/1989 | Livingston et al. | |
| 4,821,775 | A | * | 4/1989 | Cooksey | 137/68.13 |
| 5,070,575 | A | | 12/1991 | Redman et al. | |
| 5,119,956 | A | * | 6/1992 | Cioletti | 220/327 |
| 5,529,333 | A | | 6/1996 | Rizzi et al. | |
| 5,579,636 | A | | 12/1996 | Rosenfield | |
| 6,145,864 | A | | 11/2000 | Sutherland | |

OTHER PUBLICATIONS

*Scot Drawing 5647100 "Exhibit A" (Fall 1999).*

* cited by examiner

*Primary Examiner*—John Rivell
(74) *Attorney, Agent, or Firm*—Robert E. Bushnell, Esq.

(57) ABSTRACT

Apparatus and methods for fitting mechanical parts to minimize prevent free play are described. An apparatus having a piston is designed so as to restrain the piston before actuation, and so as to allow the piston to gain momentum before striking an object. The described apparatus are applicable to devices involving shearable elements. An embodiment of the invention relates to a pyrotechnically activated valve incorporating such features to minimize free play in conjunction with such features so as to restrain the piston and also allow the piston to gain momentum.

17 Claims, 11 Drawing Sheets

PISTON-ACTIVATED VALVE AND METHODS AND APPARATUS FOR RESTRAINING FREE PLAY IN A DEVICE

CLAIM OF PRIORITY

This application makes reference to, incorporates the same herein by reference, and claims all benefits accruing under 35 U.S.C.§119(e) from my application PISTON-ACTIVATED VALVE filed as a provisional application in the U.S. Patent and Trademark Office as U.S. application Ser. No. 60/261,199, filed on Jan. 16, 2001.

BACKGROUND OF THE INVENTION

1. Field of the Invention

The present invention relates to mechanical fittings and tolerancing, in particular to fittings found in shearable devices, and more particularly to pyrotechnically activated devices such as valves.

2. Background of the Invention

Pyrotechnic valves are commonly used in rockets for valves which must be opened reliably one time. Typically, these valves contain a seal tube which holds a pressurized gas, and this seal tube is pyrotechnically sheared to open the sealed end of the seal and start the flow of gas. The seal tube typically needs to be very strong in order to support the high gas pressure, such as by helium gas, dictated by the design. Also, initiator redundancy is typically needed to promote reliability. Moreover, for reliability, for example, these devices are typically built with two pyrotechnic initiators for redundancy. Also, the valve typically must be able to function using only one initiator loaded to 75% or with two initiators loaded to 125%. Such valve requirements create a range of initial ballistic gas pressures with a ratio of approximately 4:1, for example. Further, peak pressures are limited by the ability of O-rings and other gas-tight fittings to contain such pressures.

One potential method of addressing the above described needs in a pyrotechnic valve is to have the piston supply a much larger force at the beginning of a stroke. This could be accomplished, for example, by either increasing the initial ballistic gas pressure or by increasing the area of the piston that is acted on by the gas. However, such pressure increase in this first potential method can be unacceptable because of a need for initiation redundancy in the device.

A second potential method of addressing the above desired needs in a pyrotechnic valve is to increase the piston area, which can be undesirable for two reasons. First, increasing the piston area can make the piston physically large and heavy. Second, more propellant charge or possibly even an additional booster charge would be required in the initiators. These characteristics can be undesirable from a design standpoint and can generally raise the cost of the pyrotechnic valve device.

Moreover, the construction of pyrotechnic valve devices must be done to exacting tolerances. Pyrotechnic valve devices, such as those used in rocketry, for example, are often subject to considerable vibration. If there is "play" between the parts, vibrational damage can result.

SUMMARY OF THE INVENTION

It is therefore an object of the present invention to provide an improved shearable device.

A yet further object of the invention is to provide an improved shearable device for use with pyrotechnic initiators.

It is further an object of the invention to provide a device which is less sensitive to vibration.

A still further object of the invention is to provide an improved pyrovalve.

These and other objects are met by the present invention. In one embodiment, the present invention provides a method and apparatus for preventing free play in a device, such as a pyrotechnic valve device. An apparatus of this embodiment includes an eccentric sleeve, that is, a sleeve with a cylindrical outer surface and a bore which is not coaxial with the outer surface. Rotation of the eccentric sleeve adjusts the position of the bore in the eccentric sleeve, which is mated with a pin, such as a shear pin.

In another embodiment of the present invention, the present invention provides a method and apparatus for a device, such as a pyrotechnic valve device, the apparatus of this embodiment including a piston which is driven to strike an object. The piston is mounted to a mount in the device by a shear pin, and upon application of force, the shear pin shears and the piston moves through a gap before striking the object. An apparatus of this embodiment includes: a mount; a piston adjacent to the mount, the piston having a shape defining the movement direction of the piston; and a shear pin having an end partially inserted in a hole in the mount and another end of the shear pin connected to said piston for restraining the piston relative to the mount, a hammer region being formed on an end of the piston located in the direction of motion of the piston, and a strikable part being mounted in the direction of motion of the piston from the hammer region and separated from the hammer region by a gap. The other end of the shear pin is, in one alternative embodiment, connected to the shear pin through a sleeve, such as an eccentric sleeve. In another alternative embodiment, the shear pin is positioned in a spaced relation with respect to the strikable part in the direction of motion of the piston. In a further embodiment, an end of the shear pin is press fit into the mount.

Embodiments of the invention as a pyrovalve are also described. In such an embodiments, the pyrovalve includes: a housing having a cylindrical bore; a pyrotechnic initiator mounted in an upper portion of the housing; a seal tube mounted in and extending out of the housing, the seal tube having a generally cylindrical configuration and the axis of the seal tube being positioned perpendicular to the axis of the bore of said housing, the seal tube further including a shearable cap on the end of said seal tube inside the housing; and a piston located inside in the bore of the housing so as to define a direction of motion. The piston includes: a flowpath formed perpendicular to the direction of motion defined by the piston; a hollow formed in a side of the piston, further from the pyrotechnic initiator than the flowpath, and shaped to enclose the shearable cap, the hollow being larger in cross-section than the shearable cap so as to define a gap between an overhang of the piston and the shearable cap; and a shear pin connecting the shearable cap to the piston through a sleeve, for restraining play in said piston. Desirably, the sleeve is an eccentric sleeve.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

An embodiment of a valve device of the present invention is a pyrovalve, that is, a pyrotechnically activated valve. Pyrovalves can be used, for example, in rockets for valves which are activated only once. For example, a pyrovalve can be a normally closed valve mounted in proximity to a main rocket motor. The valve can be installed in a flow path between a pressurized helium tank and the interior of the main motor, for example. During the first phase of flight, the main motor burns to provide propulsion. During this time, the valve remains in the normally closed position, preventing the flow of helium to the motor. When the main rocket motor burns out, the valve is actuated to provide a helium purge to the motor. This brings the motor rapidly to a zero thrust permitting stage separation shortly thereafter.

Figure 1A:
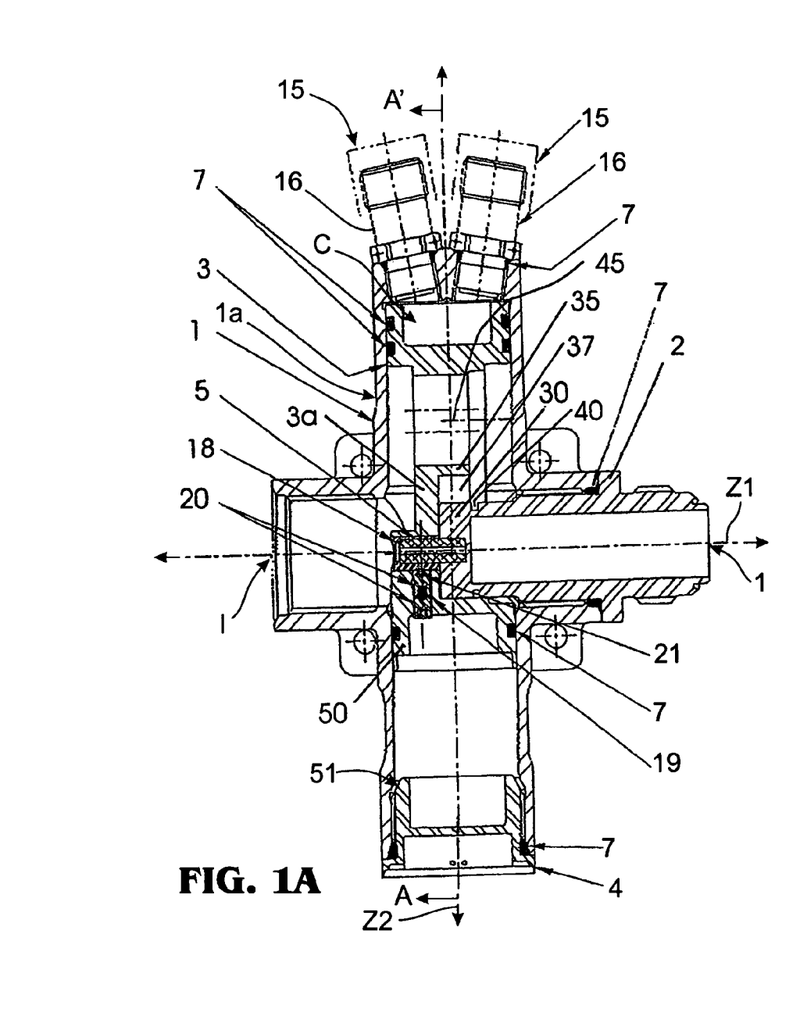
FIG. 1A is an embodiment of the present invention in the form of a pyrotechnically activated valve, seen in cross-section before activation of the valve.

An embodiment of a valve device of the present invention as a pyrovalve is shown in FIGS. 1A, 1B, 2, 5, 6A–6F, 7A–7C and 8A–8I, with FIG. 1A illustrating the pyrovalve in its normally closed position prior to activation. Referring to FIGS. 1A, 1B, 2, 5, 6A–6F, 7A–7C and 8A–8I, in this embodiment, the pyrovalve is designed to be connected to a gas source at the right side in FIG. 1A, at "inlet fitting" I. The inlet fitting I leads to seal tube 2, which is generally machined from a solid material, such as a precipitation hardened stainless steel, with no outlet, to block the flow of gas through the pyrovalve. At an end of seal tube 2 is a shearable cap 30, which is an integral part of seal tube 2, the shearable cap 30 being formed of the same material as the seal tube 2, such as a precipitation hardened stainless steel. Groove 40 in seal tube 2 "necks down" the seal tube 2, and is generally formed by machining. This necking down allows the shearable cap 30 to be mechanically sheared when the pyrovalve is actuated, but to withstand the gas pressure of the gas source, such as a helium gas source, prior to shearing. For example, in an actual embodiment of a pyrovalve, the seal tube 2 has been designed to withstand internal gas pressures in excess of 12,000 pounds per square inch, but shearable cap 30 shears off at a ballistic pressure in the vicinity of 4,000 pounds per square inch to open the flow path F when required. After actuation, the gas, such as helium, will flow from right to left toward the "Outlet Fitting" O in the pyrovalve.

Continuing with reference to FIGS. 1A, 1B, 2, 5, 6A–6F, 7A–7C and 8A–8I, within housing 1 of the pyrovalve is a piston 3 formed of a precipitation hardened stainless steel, for example. Piston 3 is also shown in greater detail in FIGS. 8A–8I. The piston 3 can be cylindrical in shape. Piston 3 can be seen in FIGS. 1A and 2 to have an upper flowpath 45, which becomes the gas flowpath F after activation of the pyrovalve. Piston 3 also has lower portion 3a which has a hollow region surrounding shearable cap 30. The hollow region is shaped to provide a gap 37 above shearable cap 30, and a portion of the piston 3 between flowpath 45 and the hollow region forms an overhang or hammer region 35, since overhang 35 appears to overhang the shearable cap 30 as seen in FIGS. 1A and 2.

Referring again to FIGS. 1A, 1B, 2, 5, 6A–6F, 7A–7C and 8A–8I, mounted in the end of seal tube 2, and extending away from the seal tube 2, is a shear pin 5, shear pin 5 being formed of any suitable fracturable material, such as aluminum, for example. Shear pin 5 is installed in the bore 18a of sleeve 18. The outside of sleeve 18 is cylindrical in shape, and sleeve 18 has a cylindrical bore 18a which is parallel to but not coaxial with the outside of the sleeve 18. Thus, sleeve 18 has an eccentric bore 18a. Sleeve 18 is shown in greater detail in FIGS. 7A–7C. The outside of sleeve 18 is mounted in a bore 3b in piston 3. Set screws 20 pass through a portion of the piston 3 and contact the outside of sleeve 18. Also, the axis Z1 of the seal tube 2 is desirably positioned perpendicular to the axis Z2 of the bore 1a of the housing 1, as illustrated in FIG. 1A, for example.

Figure 2:
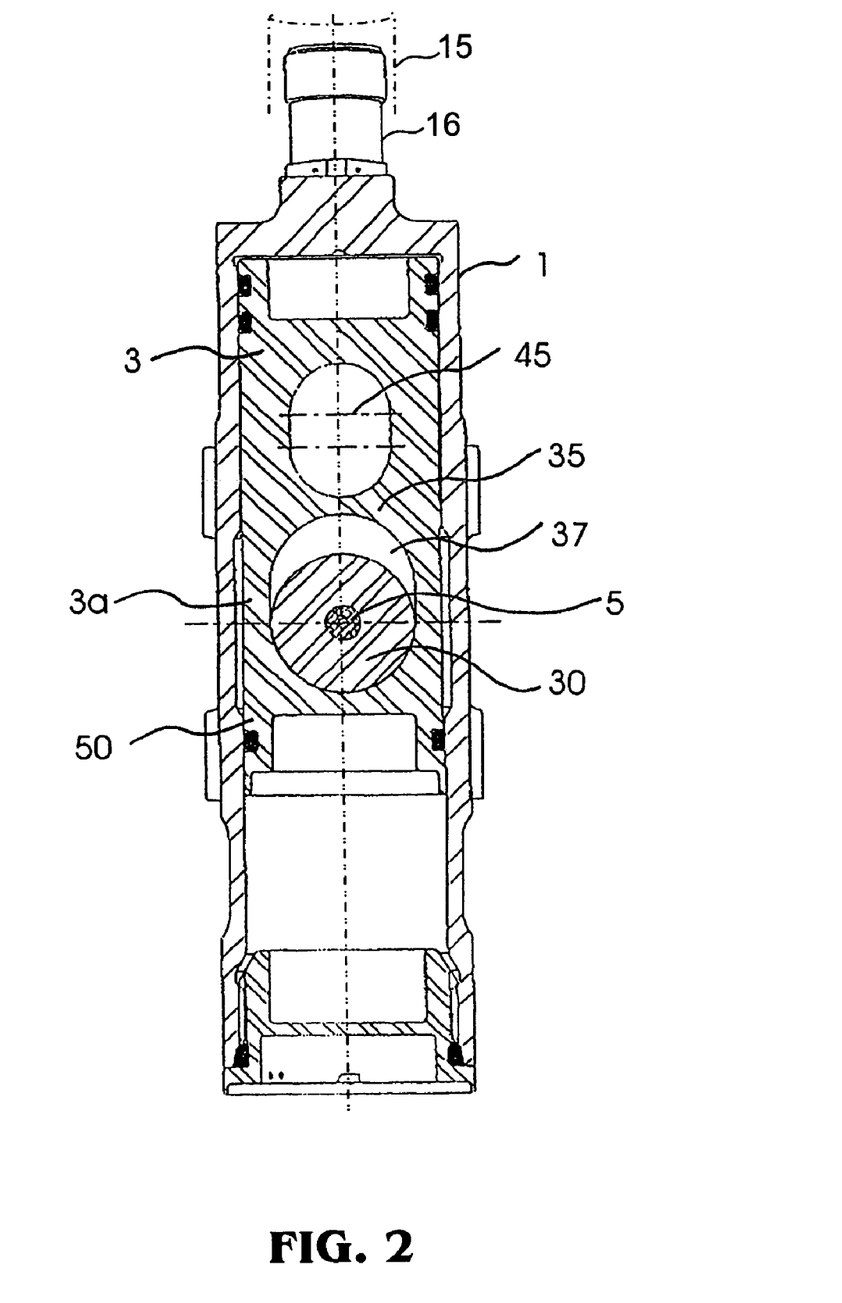
FIG. 2 is a cross-section of the valve shown in FIG. 1A, prior to activation of the valve, taken across the line labeled A–A' of FIG. 1A and of FIG. 6B.

Shown in FIGS. 1A and 2 are O-rings 7, seal 19, ball bearing or ball member 21 and lock plug 4. Also shown is Faraday cap 15, present before installation to prevent accidental discharge of the initiators 16.

In order to activate the pyrovalve, a sufficient amount of electric current is applied to one or both of electrical initiators 16. These pyrotechnic initiators produce hot pressurized gas, which are the products of combustion of the pyrotechnic materials contained within them, in the cavity C over piston 3. Gas within this cavity C is sealed by O-rings 7. The pressure, acting over the area of the piston 3, produces a force to drive the piston 3 downward as shown in the FIGS., such as FIGS. 1A and 1B. The motion of the piston 3 is resisted by the shear pin 5, which is held in place by seal tube 2, a portion of the shear pin 5 being held snugly in the seal tube 2, such as by being press fit into the seal tube 2. The shear pin 5 is designed to shear across the plane where shearable cap 30 at the left side of seal tube 2 mates with piston 3. In this particular design, the force to shear the shear pin 5 is nominally around 1,600 pounds. The shear pin 5 is designed to shear off at a lower force than is necessary for the shearing of shearable cap 30 from seal tube 2. For example, in this particular design, the shearable cap 30 requires a shear force of approximately 4,000 pounds to shear.

Figure 1B:
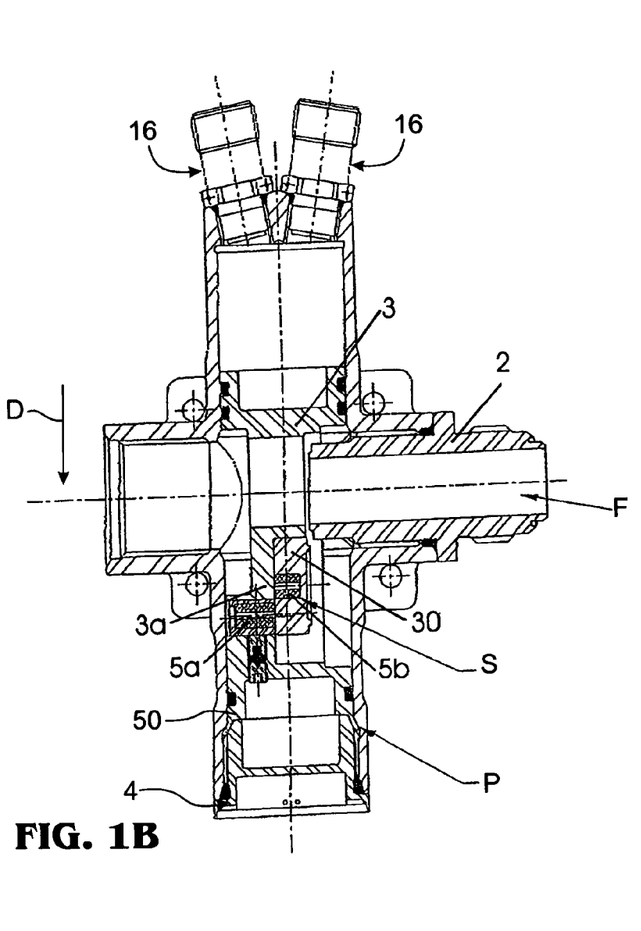
FIG. 1B is a view of the pyrotechnically activated valve of FIG. 1A shown after activation of the valve.

When the force produced by the gas is sufficient, shear pin 5 shears and piston 3 begins to travel downward in the direction of arrow D of FIG. 1B. Since the shear pin 5 is designed to shear more easily than the shearable cap 30, the shear pin 5 shears off before shearable cap 30 at the end of the seal tube 2. That is, piston 3 begins to move before the flow path F opens. After shear pin 5 shears, the piston 3 accelerates downward in the direction of arrow D, building up kinetic energy until overhang or hammer region 35 in the piston 3 strikes the shearable cap 30, the shearable cap 30 being designed to be sheared off from the seal tube 2. For example, in the specific example shown, the piston 3 travels approximately ¼ inch before striking the shearable cap 30. At this point, the kinetic energy of the moving piston 3 is well in excess of the energy required to shear off the end of the seal tube 2.

During the portion of the stroke in which the piston 3 is shearing off the shearable cap 30, the piston 3 will generally temporarily slow down. Piston kinetic energy is partially depleted and used as shear energy. The piston 3 then accelerates as a result of the expanding ballistic gas still acting on the piston 3. At the end of the piston stroke, a skirt 50 which is machined into the piston 3 flares out into a conical cavity 51 formed by the space between the lock plug 4 and housing 1, the lock plug 4 and housing 1 being made of precipitation hardened stainless steel, for example. The lock provided by the skirt 50, flaring out into the conical cavity 51, both holds the piston 3 permanently in the final position P and gently slows the piston 3, minimizing shock. In the final position P, illustrated in FIG. 1B, the final lock is engaged and the skirt 50 of piston 3 is in a flared position over the lock plug 4. Also, in the final position P, the shearable cap 30 of the seal tube 2 and the portion of shear pin 5 in the shearable cap 30 are restrained in a portion of the cavity 51 of FIG. 1A at or near position S illustrated in FIG. 1B.

When actuated, as shown in FIG. 1B, shear pin 5 can be seen to be broken into pieces 5a and 5b as illustrated in FIG. 1B. Piece 5b is retained in shearable cap 30, which has been sheared from seal tube 2.

A valves such as that shown in FIGS. 1A and 1B, is typically required to survive a very high-level shock and random vibration environments, such as during the period of time between launch and the actuation of the valve. These environments can be particularly brutal on internal components that have any "free play". Such free play can allow impact loads on internal components that rapidly cause damage. The valve of the present invention, such as the valve device of FIGS. 1A and 1B, incorporates a design to minimize such free play, which is depicted more generally in FIGS. 3A and 3B.

Figure 3A:
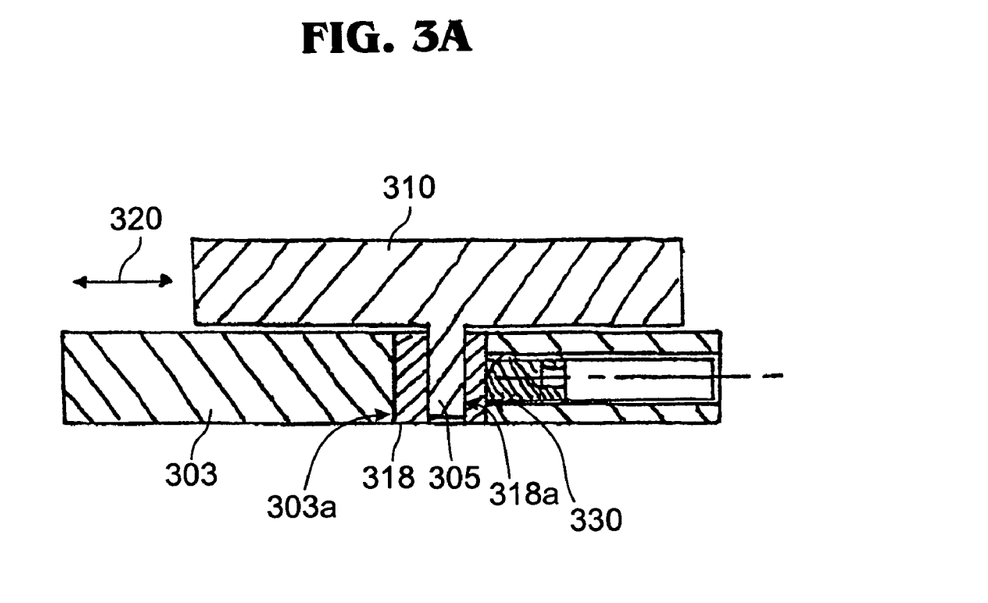
FIG. 3A is a cross-sectional view of a device, such as can be used in a valve device, illustrating a general embodiment of the invention incorporating an eccentric sleeve.
Figure 3B:
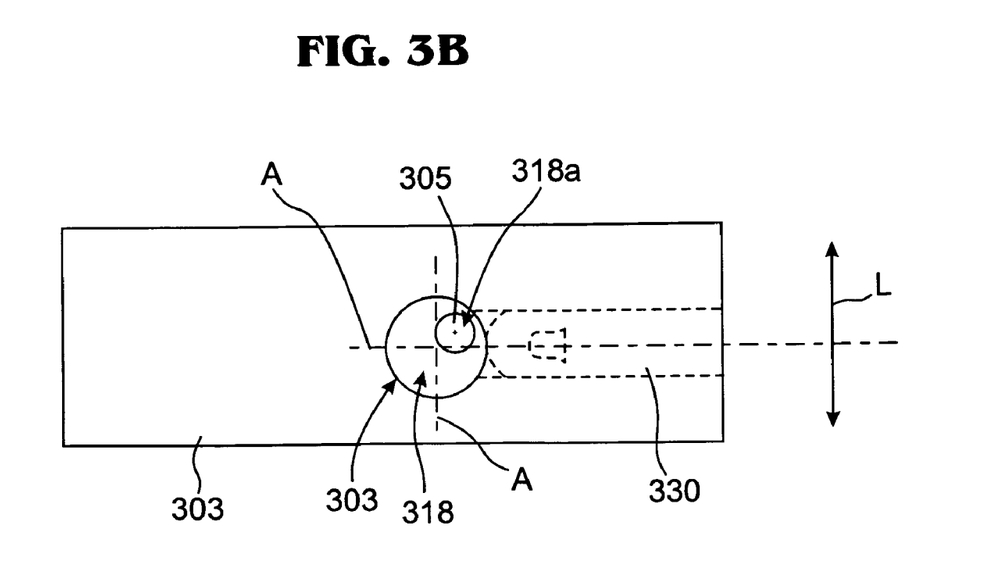
FIG. 3B is a plan view taken from the bottom of the device of FIG. 3A.

Referring now to FIGS. 3A and 3B, in FIG. 3A, an embodiment of a device of the present inventions such as can be used in a valve device to minimize free play, is shown having part 303 and part 310, where parts 303 and 310 are connected so as to avoid free play in the directions shown by double headed arrow 320. Part 303 has a cylindrical bore 303a in which sleeve 318 is fitted. Sleeve 318 has a cylindrical outer surface which fits snugly into the bore 303a in part 303. Sleeve 318 also has a cylindrical bore 318a which is parallel to, but not coaxial with, the outer cylindrical axis of sleeve 318. That is, sleeve 318 has an eccentric bore 318a. Pin 305, such as a shear pin or any shearable feature of part 310, extends from part 310. Pin 305 is cylindrical and fits snugly into the bore of sleeve 318.

In using the device of the present invention of FIGS. 3A and 3B, sleeve 318 is rotated within the bore 303a in part 303. As seen in FIG. 3B, since sleeve 318 is eccentric, rotation of sleeve 318 would cause the bore 318a in sleeve 318 to rotate around the axis A of the bore 303a in part 303, and this allows for negligible variation in the position of pin 305 in the direction of arrow 320, but sufficient variation in the lateral direction L, as indicated by the double-headed arrow L in FIG. 3B, so as to allow the assembly of parts manufactured to reasonably large tolerances.

The device of FIGS. 3A and 3B can also include a securing means, such as a set screw 330. After pin 305 is inserted into sleeve 318, set screw 330 is tightened to lock and possibly deform sleeve 318, thus locking the position of pin 305 with minimal or no free play.

This general design of a device for minimizing free play, as shown in FIGS. 3A and 3B, is incorporated into the pyrotechnic valve shown in FIGS. 1A and 1B. In the pyrotechnic valve of FIGS. 1A and 1B, the piston 3 has to be contained due to the vibration of the environment during use. Free play of 0.010 to 0.020 inches, for example, would lead to impact loads which would destroy the shear pin. Thus, in the design of a device for minimizing free play incorporated and shown in FIG. 1A, one end of shear pin 5 is press fit into shearable cap 30 of seal tube 2. Also, the pin 305 can be integrally formed as a part of part 310, as illustrated in FIG. 3A, for example. Sleeve 18 is incorporated to slip fit into bore 3a of piston 3. The eccentric design of sleeve 18 allows alignment of shear pin 5 into sleeve 18 by rotation of the sleeve 18, thereby avoiding or minimizing free play in the connection of shear pin 5 to piston 3, and thereby reducing any free play to only approximately 0.001 to 0.002 inches, for example. Set screws 20, in conjunction with ball bearing or ball member 21 as the securing means, further lock and deform sleeve 18, and further prevent or further minimize any free play.

The valve shown in FIGS. 1A and 1B also incorporates a design which allows the piston 3 to gather momentum before striking the shearable cap 30, as can be used in conjunction with the sleeve 318 of FIGS. 3A and 3B, as described above. This type of design is described more generally with reference to a general embodiment of the present invention as shown in FIGS. 4A and 4B.

Figure 4A:
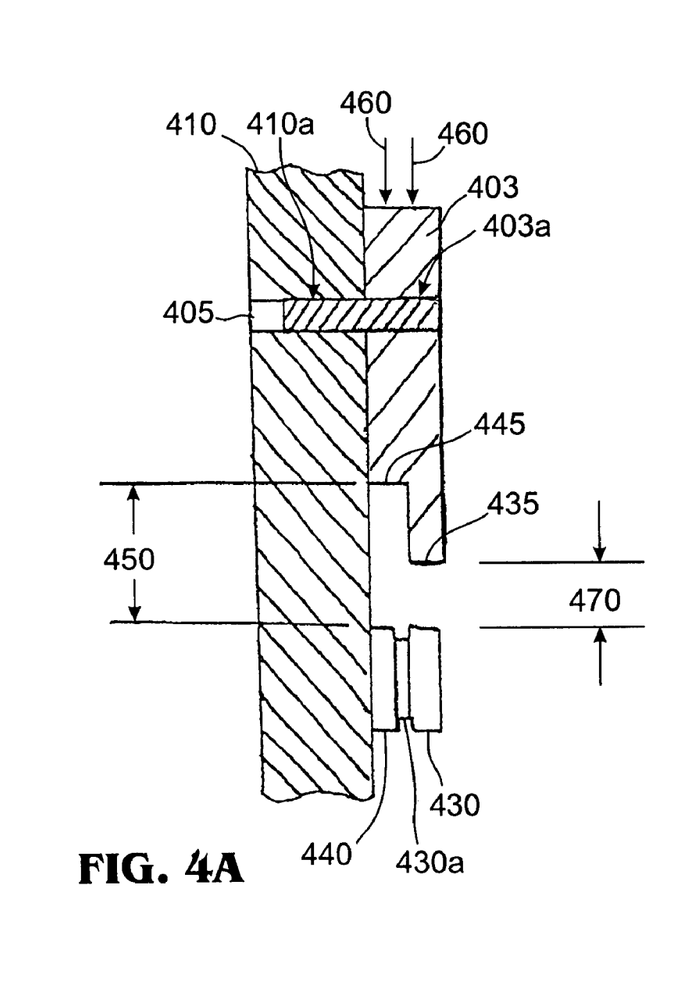
FIGS. 4A and 4B are a cross-sectional views of a device illustrating another general embodiment of a device of the invention, respectively before and after actuation of the device, such as a valve device.
Figure 4B:
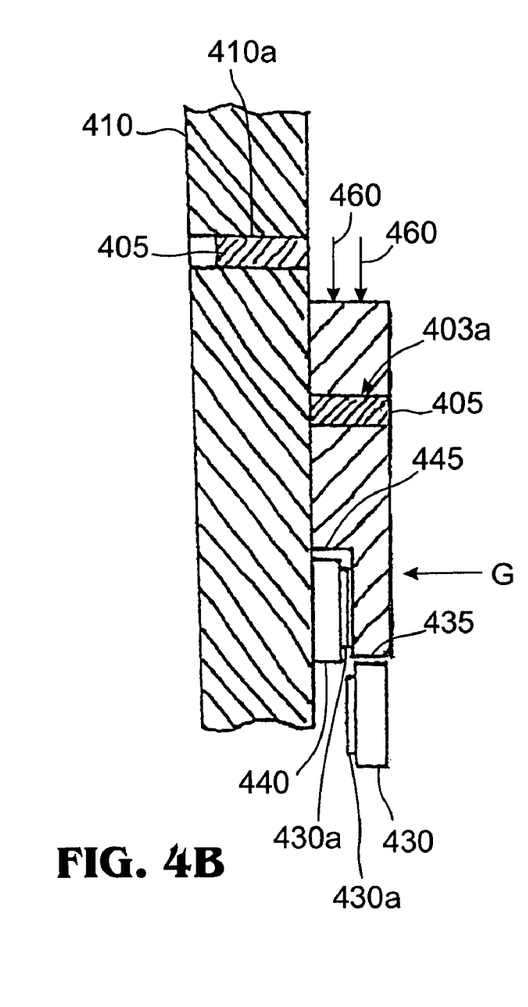
Figure 5:
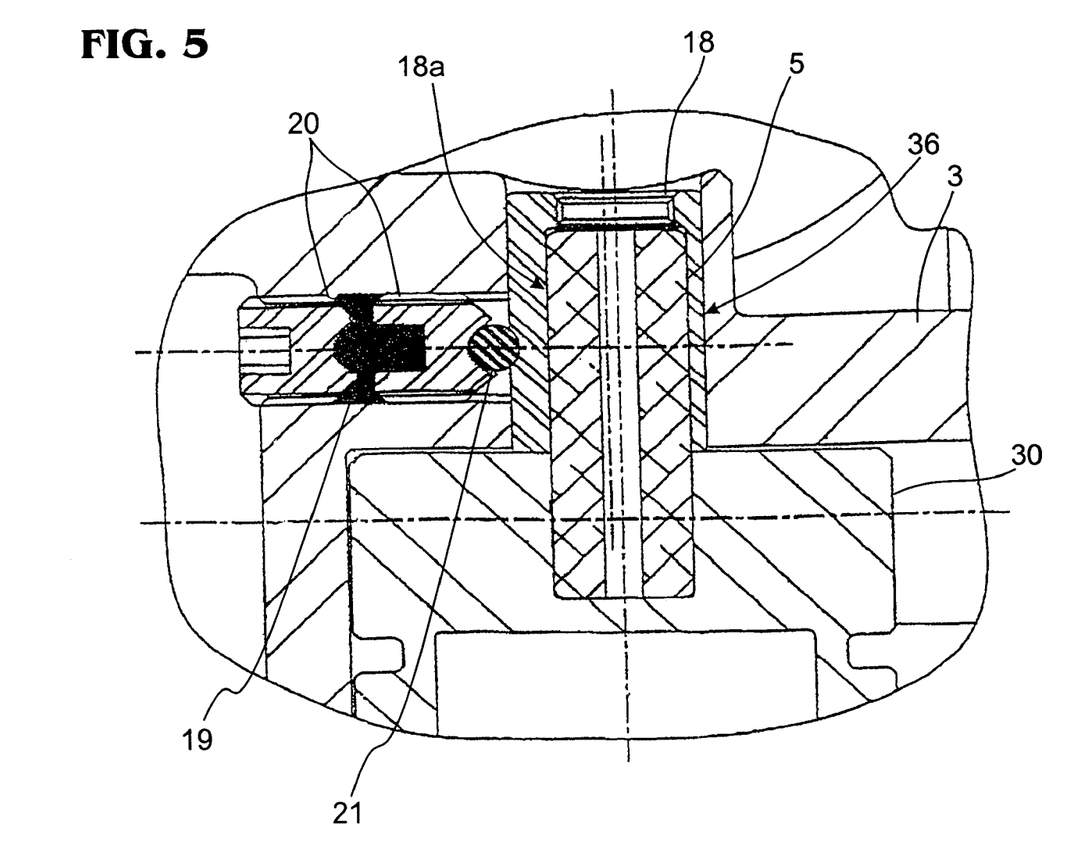
FIG. 5 is a close up of a portion to illustrate the shear pin area of the valve device shown in FIG. 1A.
Figure 6A:
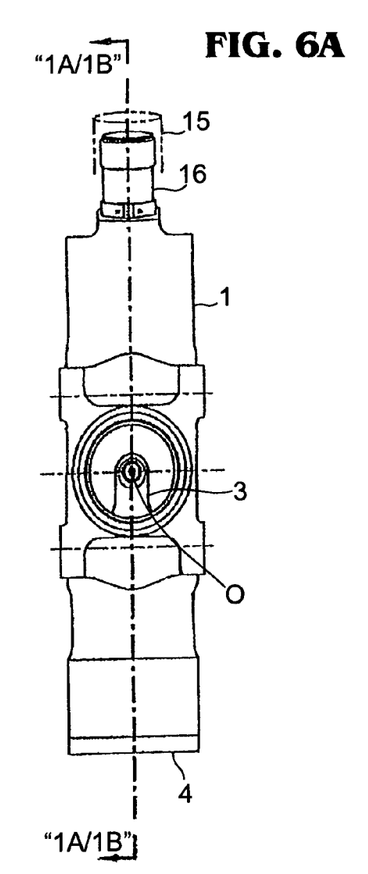
FIGS. 6A–6F are a series of views of the valve device shown in FIGS. 1A and 1B, with FIG. 6A illustrating an external side view of the valve shown in FIGS. 1A and 1B in sectional view along the section line "1A/1B", with FIG. 6B illustrating an external front view of the valve of FIGS. 1A and 1B with the sectional view of FIG. 2 taken along line A–A' and with the sectional view of FIG. 6F taken along the line "6F", with FIG. 6C illustrating a right side view of the valve of FIGS. 1A and 1B, with FIG. 6D illustrating a top external view of the valve of FIGS. 1A and 1B, with FIG. 6E illustrating a bottom external view of the valve of FIGS. 1A and 1B, and with FIG. 6F illustrating a partial sectional view of the valve of FIGS. 1A and 1B taken along the sectional line "6F" of FIG. 6B.
Figure 6B:
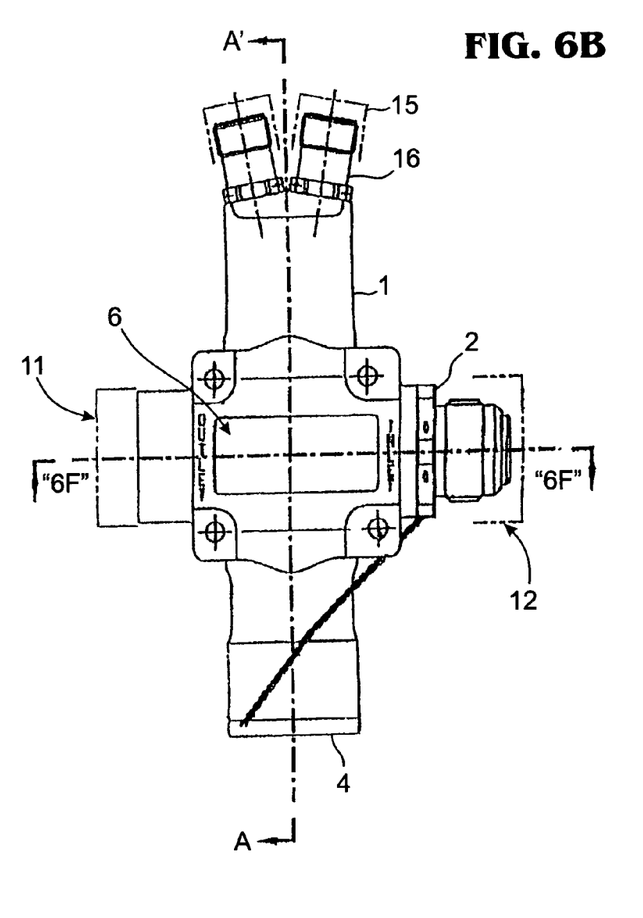
Figure 6C:
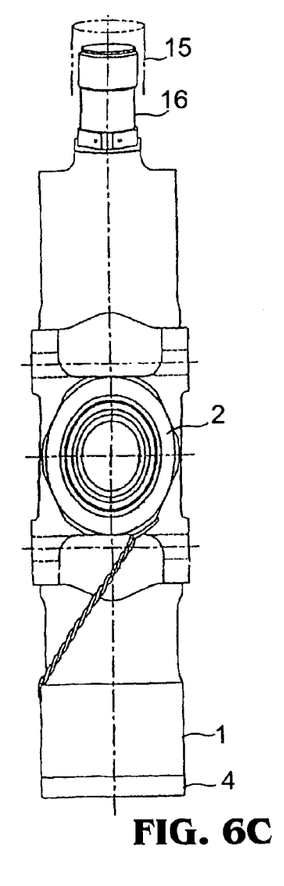
Figures 6D, 6E, 6F:
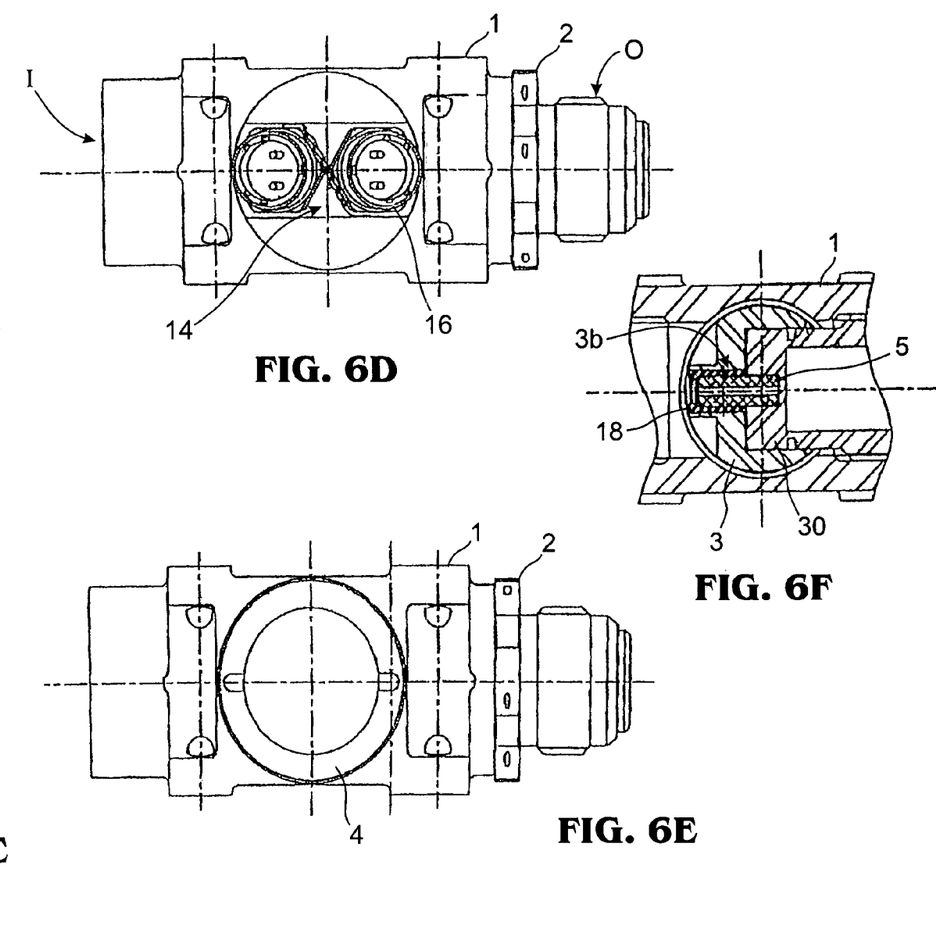
Figure 7A:
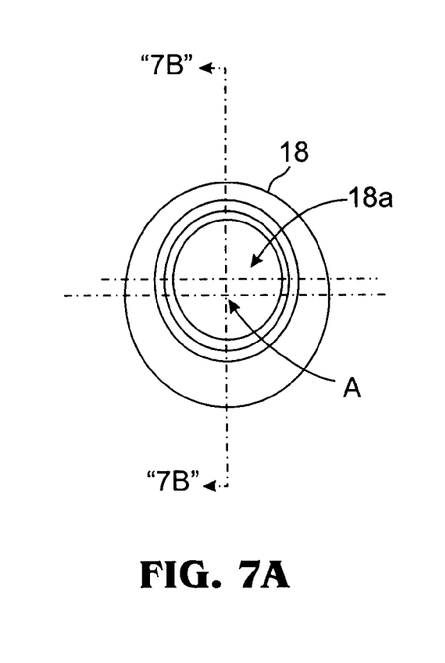
FIGS. 7A–7C are a series of views of the eccentric sleeve of the valve device shown in FIGS. 1A and 1B, with FIG. 7A illustrating a left side external view of the sleeve of FIGS. 1A and 1B, with FIG. 7B illustrating a sectional view of the sleeve of FIG. 7A taken along the section line "7B" of FIG. 7A, and with FIG. 7C illustrating a right side external view of the sleeve of FIGS. 1A and 1B.
Figure 7B:
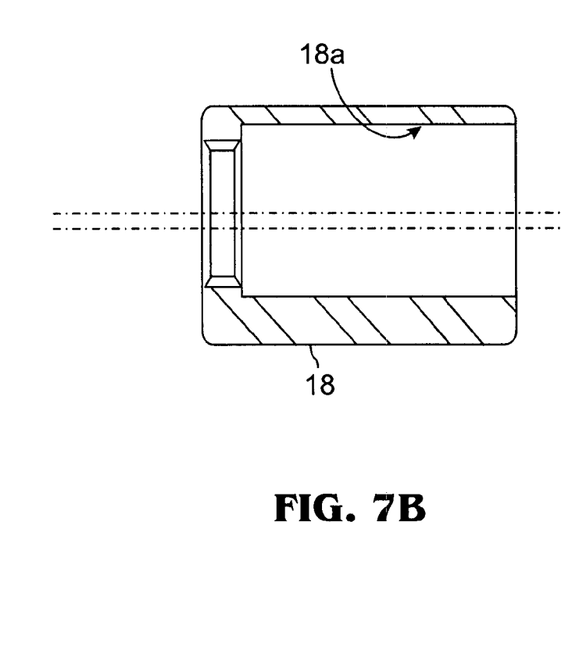
Figure 7C:
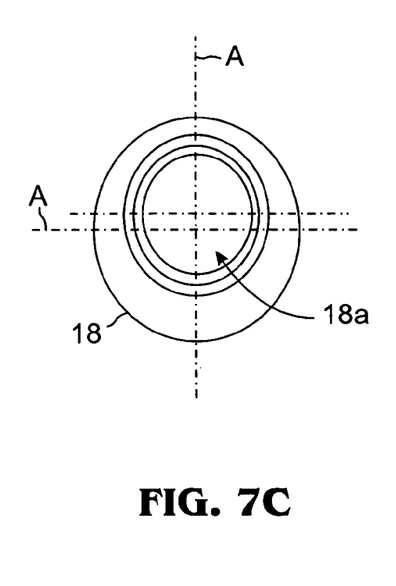
Figure 8A:
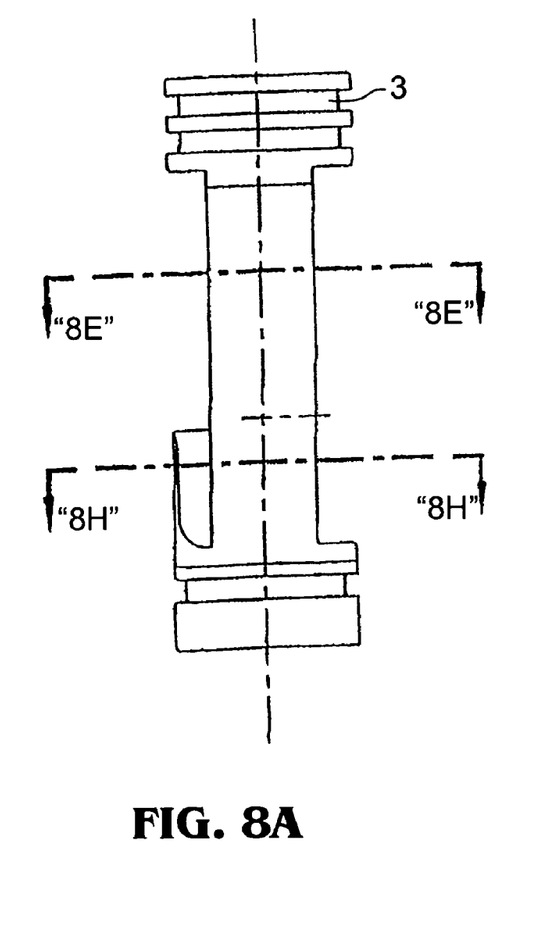
FIGS. 8A–8I are a series of views of the piston of the valve device shown in FIGS. 1A and 1B, with FIG. 8A illustrating a front external view of the piston of FIGS. 1A and 1B, with FIG. 8B illustrating a right side external view of the piston of FIGS. 1A and 1B, with FIG. 8C or illustrating a left side external view of the piston of FIGS. 1A and 1B, with FIG. 8D illustrating a cross-sectional view of the piston of FIGS. 1A and 1B illustrated in FIG. 8C taken along line "8D" of FIG. 8C, with FIG. 8E illustrating a sectional view of the piston of FIGS. 1A and 1B illustrated in FIG. 8D taken along line "8E" of FIG. 8D, with FIG. 8F illustrating a top view of the piston of FIGS. 1A and 1B, with FIG. 8G illustrating a detail view of an O-ring groove on the piston of FIGS. 1A and 1B as defined by the view illustrated in FIG. 8C, with FIG. 8H illustrating a sectional view of the piston of FIGS. 1A and 1B illustrated in FIG. 8D taken along the line "8H" of FIG. 8D, and with FIG. 8I illustrating a bottom view of the piston of FIGS. 1A and 1B.
Figure 8B:
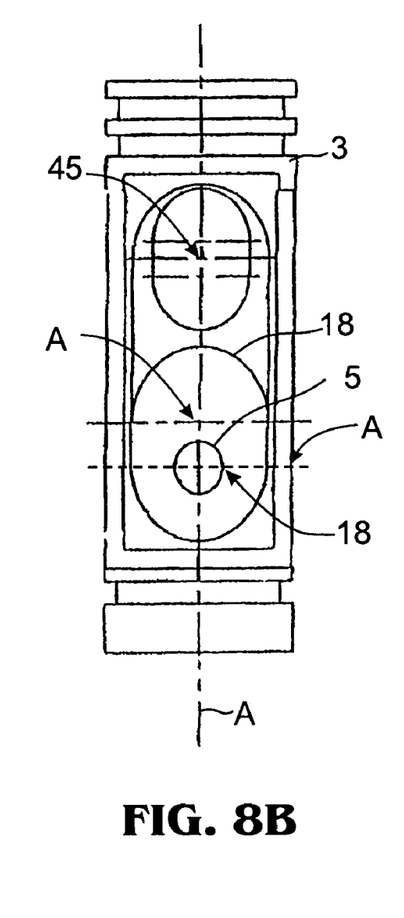
Figure 8C:
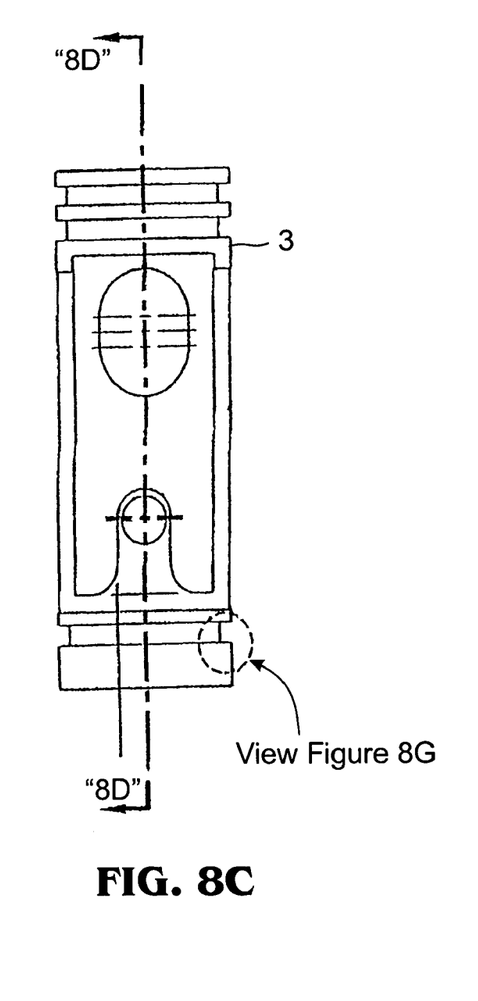
Figure 8D:
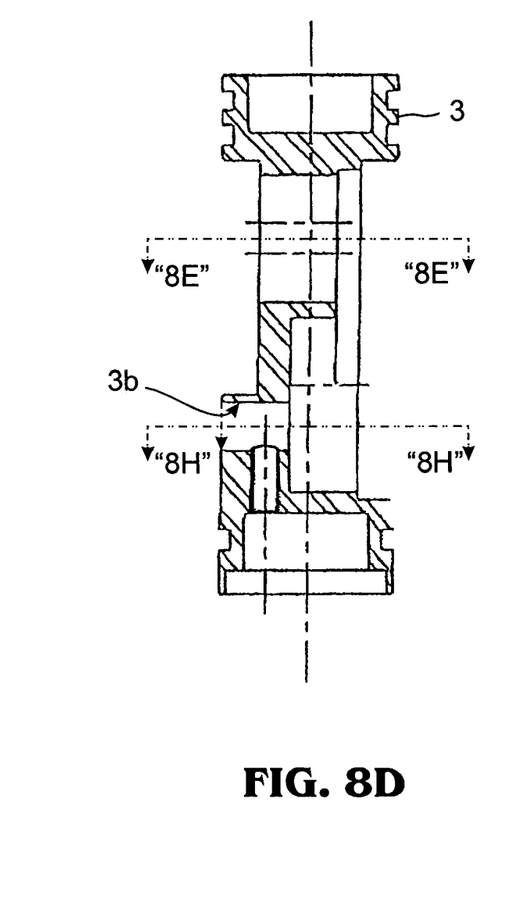
Figure 8E:
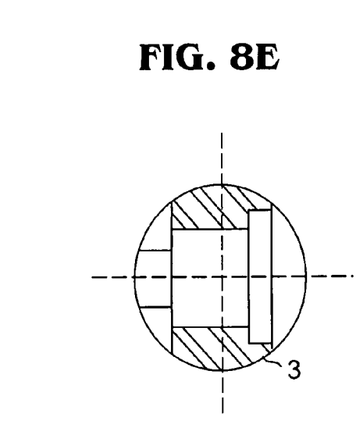
Figure 8F:
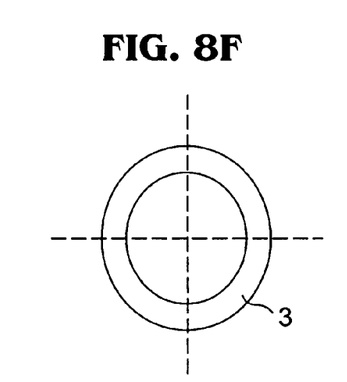
Figure 8G:
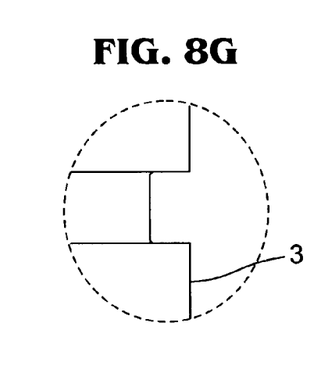
Figure 8H:
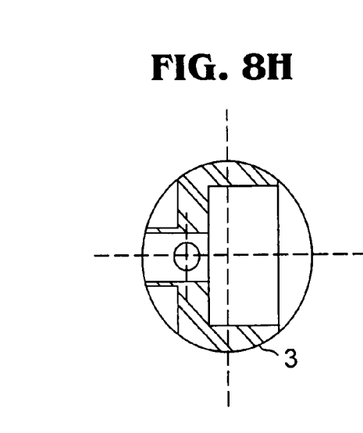
Figure 8I:
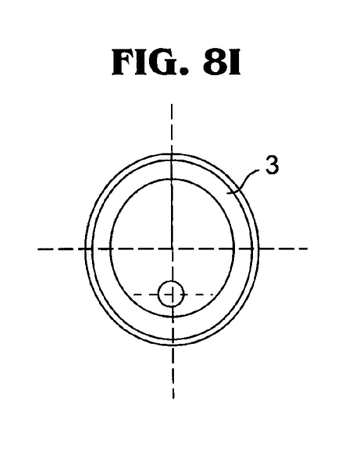

Referring to FIGS. 4A and 4B, in FIG. 4A, a device is shown including mount 410 and piston 403. Mount 410 can be a cylinder in which piston 403 rides, or can more generally be any part providing a guide surface for the downward motion of the piston 403. Likewise, piston 403 may be a cylindrical piston, or can be of any of a variety of shapes which can travel downward in the direction of the arrows indicating a propelling force 460 as shown in the FIGS. 4A and 4B. Piston 403 is mounted to the mount 410 by shear pin 405, which is inserted into holes or apertures 410a and 403a in mount 410 and piston 403, respectively.

Continuing with reference to FIGS. 4A and 4B, the lower part of piston 403 has hammer surface or hammer region 435 which is designed to deliver a blow to strikable part or shearable element 430 when the piston 403 moves. Part 430 can be any part to be struck. There is a gap 470 between the hammer surface 435 of the piston 403 and the shearable element 430.

In the particular embodiment illustrated in FIGS. 4A and 4B, strikable part or shearable element 430 is attached to a stationary part 440. As illustrated in FIGS. 4A and 4B, stationary part 440 is mounted to mount 410, but stationary part 440 could be mounted to anything stationary relative to the piston 403. Also, as shown in FIG. 4A, piston 403 can have a ledge 445 which is not aligned with hammer surface 435.

In operation, a propelling force 460, indicated by the arrows in FIGS. 4A and 4B, is applied to the top of piston 403. This propelling force can be gas pressure, pneumatic pressure, an electric or mechanical force, etc. When the force reaches a certain value, shear pin 405, which is spaced from the shearable element 430 in the direction of travel or motion of the piston 403, as illustrated in FIG. 4A, shears and the piston 403 moves downward in the direction of the arrows 460 indicating the propelling force in FIGS. 4A and 4B. Alternatively, when the mount corresponds to a seal tube, such as seal tube 2 of FIGS. 1A and 1B, the pin 405 can be press fit into the shearable cap 30 of the seal tube 2, as described previously with respect to FIGS. 1A and 1B. Piston 403 moves through gap 470 before hitting the strikable part of shearable element 430. Thus piston 403 is able to gather momentum before impact with the strikable part or shearable element 430. When used as a valve device, such as illustrated in FIGS. 1A and 1B, the shearing of the shearable element 430 would typically create a flow path G formed integrally as a passage in the piston 403, the location of the flow path G being indicated in FIG. 4B.

In the particular embodiment shown in FIGS. 4A and 4B, the strikable part or shearable element 430 is sheared off stationary part 440 upon impact at a shearable link 430a connecting the strikable part or shearable element 430 and the stationary part 440. Due to the ledge 445, the stationary part 440 is not hit by the piston 403 when shearable element 430 is impacted by the piston 403. Stationary part 440 can thus serve as a detent for stopping the downward motion of the piston 403. In such a case, the total stroke of the piston 403 is given by gap 450 illustrated in FIG. 4A. In general, there will be some sort of a detent for stopping the piston after it has hit the object to be worked on.

Although shown in FIGS. 4A and 4B for a shearable object, the device of the present invention illustrated in FIGS. 4A and 4B is applicable to any object to be struck. For example, hammer surface or hammer region 435 could be striking a rivet or nail, punching a hole, making an impression, etc., for example.

In the pyrovalve embodiment shown in FIGS. 1A and 1B, however, piston 3 is mounted by means of shear pin 5 to shearable cap 30 which is part of seal tube 2, which is held in place by the housing 1, and the shear pin 5 is not initially spaced from the shearable cap 30 in the direction of travel or motion of the piston 3. Upon activation, the piston 3 moves downward, and overhang 35 moves through gap 37 before striking shearable cap 30. In the invention as shown in FIGS. 1A and 1B, the interaction of skirt 50 with the conical cavity formed by the space between the lock plug 4 and housing 1 serves as the detent.

In the pyrovalve of the invention, the piston design, incorporating the sleeve design to minimize free play, allows the piston to gain momentum before striking the shearable cap. One result of this design is that less of the pyrotechnic explosive is required to shear the cap than in a comparable design with no shear pin in which the piston initially contacts the shearable cap.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention include all embodiments falling within the scope of the appended claims.

What is claimed is:

1. An apparatus, comprising:
   a mount having an aperture;
   a piston adjacent to said mount and having an aperture, said piston being of a shape for defining a movement direction of the piston;
   a shear pin having one end press fit into the aperture in said mount and another end inserted through a sleeve into the aperture in said piston, said shear pin restraining the piston relative to the mount;
   a hammer region formed on said piston and located in the movement direction of said piston;
   a strikable part mounted in the movement direction of the piston from said hammer region and separated from the hammer region by a gap, said strikable part sealing a flowpath of gas in said apparatus, said hammer region striking said strikable part upon movement of the piston in the movement direction through said gap; and
   a stationary part connected to said strikable part by a shearable link, said strikable part being separated from said stationary part upon being struck by said hammer region with an input force for shearing said shearble link;
   said shear pin being constructed to be shearable with less input force than the input force for shearing said shearable link so that the gas does not flow in the apparatus when said shear pin is initially sheared, but gas does flow when both said shear pin and said shearable link are sheared and said strikable part is separated from said stationary part;
   said sleeve comprising an outer surface and an eccentric bore surrounded by said outer surface for receiving said shear pin, said eccentric bore being parallel to and not coaxial with the outer surface of said sleeve.

2. The apparatus of claim 1, said strikable part being mounted to said mount.

3. The apparatus of claim 1, said stationary part being connected to said mount.

4. An apparatus, comprising:
   a mount having an aperture;
   a piston adjacent to said mount and having an aperture, said piston being of a shape for defining a movement direction of the piston;
   a shear pin having one end inserted into the aperture in said mount and another end inserted through a sleeve into the aperture in said piston, said shear pin restraining the piston relative to the mount;
   a hammer region formed on said piston and located in the movement direction of said piston;
   a strikable part mounted in the movement direction of the piston from said hammer region and separated from the hammer region by a gap, said strikable part sealing a flowpath of gas in said apparatus, said hammer region striking said strikable part upon movement of the piston in the movement direction through said gap, and said shear pin being spaced apart from said strikable part in the movement direction of said piston; and
   a stationary part connected to said strikable part by a shearable link, said strikable part being separated from said stationary part upon being struck by said hammer region with an input force for shearing said shearable link;
   said shear pin being constructed to be shearable with less input force than the input force for shearing said shearable link so that the gas does not flow in the apparatus when said shear pin is initially sheared, but gas does flow when both said shear pin and said shearable link are sheared and said strikable part is separated from said stationary part;
   said sleeve comprising an outer surface and an eccentric bore surrounded by said outer surface for receiving said shear pin, said eccentric bore being parallel to and not coaxial with the outer surface of said sleeve.

5. The apparatus of claim 4, said strikable part being mounted to said mount.

6. The apparatus of claim 4, said stationary part being connected to said mount.

7. An apparatus, comprising:
   a mount having an aperture;
   a piston adjacent to said mount and having an aperture, said piston being of a shape for defining a movement direction of the piston;
   a shear pin having one end of the shear pin inserted into the aperture in said mount and another end of the shear pin connected to said piston through a sleeve, said shear pin restraining the piston relative to the mount;
   a hammer region formed on said piston and located in the movement direction of said piston; and
   a strikable part mounted in the movement direction of the piston from said hammer region and separated from the hammer region by a gap, said hammer region striking said strikable part upon movement of the piston in the movement direction through said gap;
   said sleeve comprising an outer surface and an eccentric bore surrounded by said outer surface for receiving said shear pin, said eccentric bore being parallel to and not coaxial with the outer surface of said sleeve.

8. The apparatus of claim 7, said strikable part being mounted to said mount.

9. The apparatus of claim 7, further comprising:
   a stationary part connected to said strikable part by a shearable link, said strikable part being separated from said stationary part upon being struck by said hammer region with an input force for shearing said shearble link.

10. The apparatus of claim 9, said stationary part being connected to said mount.

11. The apparatus of claim 9, said strikable part sealing a flowpath of gas in said apparatus, said shear pin being constructed to be shearable with less input force than the input force for shearing said shearable link so that the gas does not flow in the apparatus when said shear pin is initially sheared, but gas does flow when both said shear pin and said shearable link are sheared and said strikable part is separated from said stationary part.

12. A method for restraining free play in an apparatus, comprising the steps of:
    providing a mount having an aperture;
    providing a piston adjacent to the mount, said piston being of a shape for defining a movement direction of the piston;
    inserting an end of a shear pin into the aperture of the mount and connecting another end of the shear pin to the piston through a sleeve so as to couple said mount to said piston, thereby restraining the piston relative to the mount; and
    providing said sleeve with an outer surface and an eccentric bore surrounded by said outer surface for receiving said shear pin, said eccentric bore being parallel to and not coaxial with the outer surface of said sleeve.

13. The method of claim 12, further comprising the step of:
    with said piston being restrained relative to the mount, striking a strikable part with a hammer region formed on the piston in the movement direction of the piston by traversing the piston through a gap separating the hammer region from the strikable part.

14. The method of 13, further comprising the step of:
    separating the strikable part from a stationary part when the strikable part is struck by the hammer region of the piston.

15. The method of claim 14, further comprising the step of:
    shearing the shear pin by motion of the piston.

16. The method of claim 12, further comprising the step of:
    shearing the shear pin by motion of the piston.

17. A method for the restraining free play in an apparatus, comprising the steps of:
    providing a mount;
    providing a piston adjacent to the mount, the piston being of a shape for defining a movement direction of the piston;
    press fitting an end of a shear pin into the mount and coupling another end of the shear pin through a sleeve to said piston for restraining the piston relative to the mount;
    shearing the shear pin by motion of the piston;
    striking a strikable part mounted in the movement direction of the piston by a hammer region formed on the piston by moving the piston through a gap separating the hammer region and the strikable part; and
    separating the strikable part from a stationary part when the strikable part is struck by the hammer region;
    wherein the strikable part seals a flowpath of gas with apparatus until separated from the stationary part;

wherein the shear pin is sheared by less force than is required to separate the strikable part from the stationary part so that the gas does not flow through the flowpath when the shear pin is initially sheared, but only flows through the flowpath when the strikable part is separated from the stationary part a certain amount of time after shearing of the shear pin; and wherein said sleeve is provided with an outer surface and an eccentric bore surrounded by said outer surface for receiving said shear pin, said eccentric bore being parallel to and not coaxial with the outer surface of said sleeve.

* * * * *